United States Patent [19]

Boyd et al.

[11] 4,030,881
[45] June 21, 1977

[54] COLORATION PROCESS

[75] Inventors: Violet Boyd; Brian Ribbons Fishwick; Brian Glover, all of Manchester, England

[73] Assignee: Imperial Chemical Industries Limited, London, England

[22] Filed: Oct. 8, 1975

[21] Appl. No.: 620,694

[30] Foreign Application Priority Data

Oct. 31, 1974 United Kingdom ............ 47112/74
Mar. 25, 1975 United Kingdom ............ 12425/75

[52] U.S. Cl. .................................. 8/39 C; 8/41 C;
8/73; 8/167; 8/168 C; 8/179

[51] Int. Cl.² ...................... C09B 1/00; C09B 5/62; D06P 5/02

[58] Field of Search .............. 8/41 C, 167, 39 C, 73

[56] References Cited

UNITED STATES PATENTS

| | | | |
|---|---|---|---|
| 1,926,086 | 9/1933 | Dreyfus | 8/5 |
| 2,222,733 | 11/1940 | Ackermann | 269/264 |
| 2,290,945 | 7/1942 | Dahlen et al. | 8/62 |
| 3,480,378 | 11/1969 | Taube et al. | 8/39 |
| 3,642,427 | 2/1972 | Berrie et al. | 260/156 |
| 3,934,972 | 1/1976 | Greenhalgh et al. | 8/39 |

FOREIGN PATENTS OR APPLICATIONS 1,087,673  10/1967  United Kingdom

*Primary Examiner*—Harry Wong, Jr.
*Assistant Examiner*—H. L. Clingman
*Attorney, Agent, or Firm*—Cushman, Darby & Cushman

[57] ABSTRACT

Process for the coloration of aromatic polyester or cellulose triacetate textile materials which comprises applying to the said textile material by an aqueous dyeing, padding or printing process a disperse dyestuff which contains at least two carboxylic acid ester groups and subsequently giving the colored textile material a treatment in an aqueous solution of an alkali having a pH above 8 and at a temperature between 50° and 85° C, whereby the textile materials are colored in a wide variety of shades possessing very good to excellent fastness properties.

3 Claims, No Drawings

COLORATION PROCESS

This invention relates to an improved process for colouring aromatic polyester or cellulose triacetate textile materials.

In the conventional processes for colouring aromatic polyester or cellulose triacetate textile materials a disperse dyestuff, or mixture of such dyestuffs, is applied to the said textile materials by aqueous dyeing, padding or printing processes, the dyestuff being fixed on the textile material by a simultaneous or subsequent heat treatment. However in order that the resulting coloured textile materials have the maximum fastness properties it is necessary that any unfixed dyestuff be removed from the surfaces of the fibres making up the textile material. In the case of pale depths of shade (i.e. when relatively small quantities of dyestuff were used in the colouring process) any unfixed dyestuff can usually be removed by a simple washing treatment. However in the case of heavy depths of shade, when much larger quantities of dyestuff are involved, such a treatment does not remove all the unfixed dyestuff and, in order to overcome this a more drastic treatment is required. This normally involves a "reduction-clear" treatment (i.e. a treatment for a few minutes in a warm aqueous alkaline solution of a reducing agent such as sodium hydrosulphite). However the use of a reduction-clear treatment raises problems in that air has to be excluded (so as to prevent oxidation), and disposal of the waste liquors from the treatment can give rise to ecological problems. In addition any unfixed azo disperse dyestuffs are much more efficiently removed by a reduction-clear treatment than unfixed anthraquinone dyestuffs which generally require an "oxidative-clear" treatment for complete removal of unfixed dyestuff. Thus when mixtures of these two types of dyestuff are applied together complete removal of all unfixed dyestuff can require two different clearing treatments, which is additionally time consuming and adds significantly to the overall cost of the colouring process.

It has been found that the above-mentioned difficulties and disadvantages can be overcome by using as the disperse dyestuff a disperse dyestuff which contains at least two carboxylic acid ester groups, any unfixed dyestuff being removed by a simple treatment in a warm aqueous solution of an alkali (i.e. which does not additionally contain a reducing agent). Although it has already been proposed to use such dyestuffs for colouring aromatic polyester or cellulose triacetate textile materials, the only disclosures of after treatments relate to a washing treatment in a warm aqueous solution of soap. Whilst such solutions are in fact alkaline they are much less effective than a solution of an alkali (such as an aqueous solution of sodium carbonate) at the same concentration or having approximately the same pH in removing unfixed dyestuff, so that the colourations produced by the present process have much superior fastness properties than the colourations produced by these prior art processes.

According to the present invention there is provided an improved process for the colouration of aromatic polyester or cellulose triacetate textile materials which comprises applying to the said textile material by an aqueous dyeing, padding or printing process a disperse dyestuff which contains at least two carboxylic acid ester groups and subsequently giving the coloured textile material a treatment in an aqueous solution of an alkali having a pH above 8 and at a temperature between 50° and 85° C.

The process of the invention can be conveniently carried out by immersing the said textile material in a dyebath comprising an aqueous dispersion of a disperse dyestuff, as hereinbefore defined, the dispersion being stabilised, if desired, by dispersing agents, for example non-ionic dispersing agents, cationic dispersing agents and anionic dispersing agents or a mixture of two or more such dispersing agents. Dyeing is then carried out at the temperature usually employed for the particular textile material. Thus in the case of cellulose triacetate textile materials it is preferred to carry out the dyeing process at 95° C to 100° C; whilst in the case of aromatic polyester textile materials the dyeing process can either be carried out at a temperature between 90° and 100° C, preferably in the presence of a carrier such as diphenyl or o-hydroxydiphenyl, or a temperature above 100° C. preferably at a temperature between 120° and 140° C. under superatmospheric pressure, when a carrier is not usually necessary Alternatively an aqueous dispersion of the disperse dyestuff can be padded onto the said textile material, and the dyestuff is fixed on the textile material by steaming it for short periods at temperatures between 100° and 180° C. or by baking it at temperatures between 160° and 220° C. If desired the padding liquor can contain the conventional additives, for example dispersing agents,, thickeners, migration inhibitors, or urea.

As a further alternative a thickened printing paste containing the disperse dyestuff in dispersed form can be applied to the surface of the synthetic textile materials by any of the methods conventionally used for applying printing pastes to synthetic textile materials, for example by block, screen or roller printing. The printed textile material, optionally after being dried, is then steamed for short periods at temperatures between 100° and 180° C, or is baked at temperatures between 160° and 220° C. Suitable thickening agents which are present in the printing paste include gum tragacanth, gum arabic, alginates, or oil-in-water or water-in-oil emulsions. The printing pastes can also contain conventional additives such as urea and sodium m-nitrobenzene sulphonate.

After the dyeing, padding or printing process has been carried out the coloured textile material is optionally rinsed in water and is then given a treatment in a hot aqueous solution of an alkali having a pH of at least 8.0, preferably at a temperature of 60° to 80° C, higher temperatures generally being used at the lower pH's and vice-versa, and the time of treatment will vary on the depth of shade which has been applied to the textile material and the type of equipment which is being used; however the times are usually in the range of 30 seconds to 30 minutes. If desired the said alkaline solution can also contain a small amount (for example 0.2 to 1.0% by weight based on the weight of the solution) of a synthetic detergent. After the alkaline treatment the textile material is rinsed in water, optionally containing a synthetic detergent, and is then dried.

The said alkaline solutions are prepared from alkaline agents such as ammonia or ammonium salts or organic amines such as triethanolamine, but preferred alkaline agents are carbonates or hydroxides of alkali metals such as lithium, potassium and sodium.

Although the above process is described with reference to the use of a single disperse dyestuff, as hereinbefore defined, in many cases, in order to obtain the required shades, it is necessary to use a mixture of the said disperse dyestuffs, and the use of such mixtures is within the scope of the present invention.

The textile materials which can be coloured by the process of the invention can be in the form of thread, yarn or woven or knitted goods. The aromatic polyester textile materials are preferably polyethyleneterephthalate textile materials. If desired the said textile materials can be in the form of blends or unions with synthetic polyamides such as Nylon 6:6 or Nylon 6, in which case the synthetic polyamide fibres present are also coloured by the said disperse dyestuff.

The disperse dyestuffs containing at least two carboxylic acid ester groups can be a dyestuff of any of the known classes of disperse dyestuffs containing at least two of the specified groups, in particular of the nitro, methine, azomethine, and above all, anthraquinone and preferably azo in particular monoazo series. The carboxylic acid ester groups are preferably of the formula: COOR wherein R is an optionally substituted hydrocarbon or heterocyclic radical. In particular R is cycloalkyl such as cyclohexyl, monocyclic aryl such as phenyl, tolyl and xylyl and substituted derivatives thereof such as anisyl, chlorophenyl and bromophenyl, monocyclic aryl such as benzyl or β-phenylethyl, or preferably an alkyl radical such as hexyl, octyl, dodecyl but more especially lower alkyl containing from 1 to 4 carbon atoms such as ethyl, propyl, butyl and above all methyl. Alternatively R can be a substituted alkyl radical in particular substituted lower alkyl, for example hydroxy lower alkyl such as β-hydroxyethyl and lower alkoxy lower alkyl such as γ-methoxypropyl. The said carboxylic acid ester groups can be directly attached to carbon atoms of a benzene or heterocyclic ring or rings present in the dyestuff molecule or attachted thereto by a bridging group such as

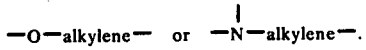

A preferred class of such azo dyestuffs comprises the dyestuffs of the formula:

wherein A is the residue of a diazo component of the aromatic or heterocyclic series and E the residue of a coupling component, R has the above stated meaning, and $n$ and $m$ each independently represent 0,1 or 2, the sum of $n$ and $m$ being at least 2.

A second preferred class of azo dyestuffs comprises the dyestuffs of the formula:

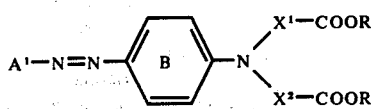

wherein $A^1$ is the radical of a diazo component of the aromatic or heterocyclic series, the benzene ring B can contain additional substituents, R has the meaning stated, and $X^1$ and $X^2$ each independently represent lower alkylene or lower alkylene-O-lower alkylene radicals wherein lower alkylene denotes alkylene radicals of from 1 to 6 carbon atoms.

A further preferred class of azo dyestuffs comprises the dyestuffs of the formula:

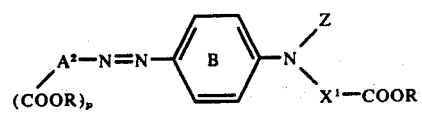

wherein B, $X^1$ and R have the meanings stated, Z is a hydrogen atom or an optionally substituted alkyl, cycloalkyl or aryl radical, $A^2$ is the radical of a diazo component of the aromatic or heterocyclic series, and $p$ is 1 or 2.

A still further preferred class of azo dyestuffs comprises the dyestuffs of the formula:

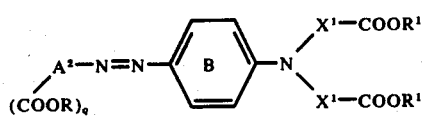

wherein $A^2$, B, R and $X^1$ have the meanings stated, $R^1$ is lower alkyl, and $q$ is 2 or, preferably, 1.

A still further preferred class of dyestuffs comprises the dyestuffs of the formula:

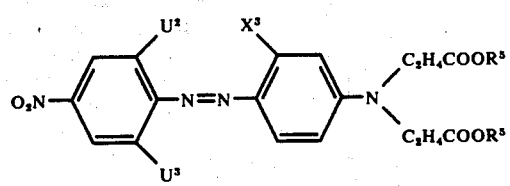

wherein
$U^2$ and $U^3$ are each independently chlorine or bromine;
$X^3$ is hydrogen or methyl; and
$R^5$ is lower alkyl As examples of substituents which can be present on the benzene ring B there may be mentioned lower alkyl in particular methyl, lower alkoxy such as methoxy and ethoxy, chlorine, bromine and acylamino groups in particular acylamino groups of the formulae

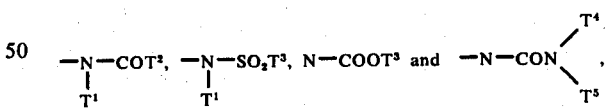

wherein $T^1$, $T^4$ and $T^5$ are each independently hydrogen or lower alkyl, $T^2$ is hydrogen, lower alkyl or monocyclic aryl, and $T^3$ is lower alkyl or monocyclic aryl. Preferably the said acylamino group is the formula: —NHCO lower alkyl.

Throughout this Specification the terms "lower alkyl" and "lower alkoxy" are used to denote alkyl and alkoxy radicals respectively containing from 1 to 4 carbon atoms.

The radicals of the diazo components represented by A, $A^1$ and $A^2$ can be the radicals of any diazo components of the heterocyclic series, in particular optionally substituted thiazol-2-yl, benzthiazol-2-yl, thien-2-yl, benz-2:1-isothiazol-3-yl, benz-1:2-isothiazol-3-yl, 1:2:4-thiadiazol-5-yl, 1:3:4-thiadiazol-2-yl; isothiazol- 5-yl, pyrazol-3-yl, imidiazol-(2-or-5)yl, 1:2:4-triazol-3-yl and tetrazol-5-yl radicals. In particular A, A¹ and A² are the radical of a diazo component of the aromatic series in particular an optionally substituted naphthyl and, above all, an optionally substituted phenyl radical. The substituent or substituents present on such radicals can be any of the substituents, apart from carboxylic acid and sulphonic acid groups, which are conventionally present on the diazo radicals of disperse azo dyestuffs, for example chlorine, bromine, nitro, cyano, trifluoromethyl, lower alkyl, lower alkoxy, lower alkylsulphonyl, lower alkylcarbonyl, acylamino in particular lower alkylcarbonylamino, sulphonamido and N-substituted and N:N-disubstituted derivatives thereof, carbonamido and N-substituted and N:N-disubstituted derivatives thereof, and carboxylic acid ester groups in particular lower alkoxycarbonyl. Preferably A, A¹ and A² are optionally substituted phenyl radicals and in particular radicals of the formulae

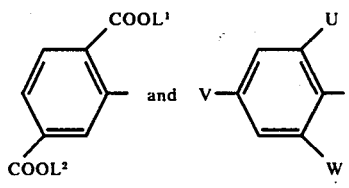

wherein L¹ and L² are each independently lower alkyl; U and W are each independently hydrogen, lower alkyl, chlorine, bromine, lower alkoxy, nitro, cyano or lower alkoxy carbonyl, and V is hydrogen, nitro, chlorine, bromine, lower alkyl, lower alkoxy, cyano, lower alkoxy carbonyl, sulphonamido or carbonamido and N- and N:N-substituted derivatives thereof, lower alkylcarbonyl and lower alkyl sulphonyl. Preferably V is nitro.

In the above classes A, A¹ and A² preferably represent a phenyl radical which can contain up to 3 substituents, preferably the substituents exemplified above as being present on the said diazo radical.

The said disperse dyestuffs used in the process of the invention can be obtained by the methods which are conventionally employed in preparing disperse dyestuffs, provided that the methods employ the use of the appropriate reactants containing in total at least two —COOR groups. Thus, for example, disperse azo dyestuffs for use in the process can be obtained from diazo and coupling components which together contain at least two —COOR groups.

If desired the said disperse dyestuffs can be applied by the process of the present invention in conjunction with a disperse dyestuff, which, in one of the possible tautomeric forms, is of the formula:

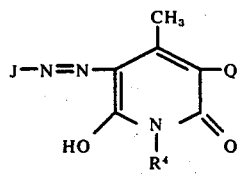

wherein J is a phenyl radical or a phenyl radical which carries at least one substituent (other than a carboxylic acid or sulphonic acid group) which does not contain an alkyl radical having more than 4 carbon atoms, R⁴ is hydrogen or lower alkyl, and Q is hydrogen, lower alkyl, cyano, carbamoyl, lower alkoxycarbonyl or lower alkylcarbonyl, as any unfixed dyestuff of this type is likewise removed by the treatment in the aqueous solution of the alkali.

By the process of the invention cellulose triacetate and aromatic polyester textile materials are coloured in a wide variety of shades possessing very good to excellent fastness to the tests commonly applied to such textile materials. In those cases where the process is carried out by printing, there is no staining of the unprinted areas of the textile material.

The invention is illustrated but not limited by the following Examples in which the parts and percentages are by weight:-

EXAMPLE 1

100 parts of a woven aromatic polyester textile material are immersed in a dyebath comprising a dispersion of 1 part of 2-chloro-4-nitro-6-bromo-4'-[N:N-di(β-methoxycarbonylethyl)amino] azobenzene in 3000 parts of water containing 1 part of oleyl sodium sulphate. The dyebath is then heated to 130° C during 30 minutes and maintained at this temperature for an hour under superatmospheric pressure. The dyed textile material is then removed from the dyebath, rinsed in water, treated for 10 minutes at 80° C in an aqueous solution of 0.2% of sodium hydroxide and 0.2% of a non-ionic detergent. The textile material is again rinsed in water, and is then dried.

The aromatic polyester textile material is thereby dyed a brown shade possessing excellent fastness to light, to wet treatments and to dry heat treatments.

EXAMPLE 2

10 parts of a 10% aqueous dispersion of 2-acetylamino-4-[N:N-di(β-methoxycarbonylethyl)amino]-4'-nitroazobenzene are added to a mixture of 2 parts of an aqueous emulsion of sulphonated sperm oil and pine oil, 10 parts of urea, 1 part of sodium m-nitrobenzenesulphonate, 0.6 parts of sodium hexametaphosphate, 48.4 parts of a 10% aqueous solution of sodium alginate and 28 parts of water, and the resulting print paste is printed onto a knitted aromatic polyester textile material. The printed material is dried and is then steamed for 6 minutes in superheated steam at 170° C. The material is then rinsed in water, treated for 5 minutes in a 0.2% aqueous solution of sodium hydroxide at 80° C (the liquor to goods ratio being 50:1), rinsed again in water, and is finally dried.

A red print is obtained having excellent fastness to wet treatments and there is no staining of the unprinted areas.

Instead of steaming the printed material in order to fix the dyestuff, the printed material is baked for 1 minute at 200° C. A similar result is obtained.

EXAMPLE 3

In place of the 10 parts of 10% aqueous dyestuff dispersion used in Example 2 there are used 10 parts of a 10% aqueous dispersion of 2-acetylamino-4-[N:N-di(β-methoxycarbonylethyl)amino]-4'-methoxycarbonylazobenzene or of 1:4-di(β-methoxycarbonylethylamino) anthraquinone whereby orange and blue prints respectively are obtained. Similar results are obtained when the aromatic polyester textile material is replaced by a cellulose triacetate textile material.

EXAMPLE 4

A padding liquor comprising a mixture of 5 parts of a 10% aqueous dispersion of 2-acetylamino-4-[N:N-di(β-methoxycarbonyl)ethyl)amino]-4′-nitroazobenzene, 1 part of a 25% aqueous solution of the sodium salt of partially hydrolysed polyacrylonitrile and 94 parts of water is continuously padded onto a woven aromatic polyester textile material, and after drying the material is continuously passed through a baker operating at 220° C, the time of contact being 1 minute. The material is then rinsed in water, treated for 5 minutes at 80° C in an aqueous solution containing 0.2% of sodium hydroxide and 0.2% of a non-ionic detergent, rinsed again in water and finally dried.

The textile material is coloured overall in a red shade possessing excellent fastness to wet treatments.

In place of the aromatic polyester textile material used in this Example there is used a woven 67:33 aromatic polyester/cellulose union whereby the aromatic polyester fibres are coloured a red shade and the cellulose fibres are uncoloured.

In place of the disperse dyestuffs used in any of the above Examples there are used the disperse azo dyestuffs obtained by diazotising the amines and coupling with the coupling components listed in Table I or the disperse dyestuffs listed in Table II whereby the aromatic polyester textile materials are coloured in the shades stated in the Tables.

TABLE I

| Amine | Coupling Component | Shade |
|---|---|---|
| aniline | N:N-di(β-methoxycarbonylethyl)aniline | Yellow |
| 2-chloroaniline | " | Yellow |
| 4-acetylaniline | " | Reddish-yellow |
| 4-nitroaniline | " | Reddish-orange |
| 2-bromo-4-nitroaniline | " | Scarlet |
| 2-nitroaniline | " | Orange |
| 2-methoxy-4-nitroaniline | " | Scarlet |
| 2:4-dinitroaniline | " | Red |
| 2-chloro-4:6-dinitroaniline | " | Rubine |
| 2-bromo-4:6-dinitroaniline | " | Rubine |
| 2-cyano-4:6-dinitroaniline | " | Violet |
| 3-nitroaniline | " | Reddish-yellow |
| 2-acetyl-4-nitroaniline | " | Scarlet |
| 2-methyl-4-nitroaniline | " | Reddish-orange |
| 4-nitroaniline | N:N-di(β-methoxycarbonylethyl)-m-toluidine | Scarlet |
| 2-bromo-4:6-dinitroaniline | 2-methoxy-5-acetylamino-N:N-di(β-methoxycarbonylethyl)aniline | Navy blue |
| 2-bromo-4:6-dinitroaniline | 3-acetylamino-N:N-di(β-methoxycarbonylethyl)aniline | Violet |
| 2-bromo-4:6-dinitroaniline | 3-chloroacetylamino-N:N-di(β-methoxycarbonylethyl)aniline | Violet |
| 2-chloro-4-nitro-6-cyanoaniline | 3-acetylamino-N:N-di(β-methoxycarbonylethyl)aniline | Violet |
| 2-cyano-4-nitroaniline | 3-acetylamino-N:N-di(β-methoxycarbonylethyl) | Violet |
| 2:4-dicyanoaniline | 3-acetylamino-N:N-di(β-methoxycarbonylethyl) | Red |
| 4-acetylaminoaniline | 3-cyano-N:N-di(β-methoxycarbonylethyl)aniline | Orange |
| 3-chloro-4-cyanoaniline | 2-ethoxy-5-acetylamino-N:N-di(β-methoxycarbonylethyl)aniline | Bluish-red |
| 6-ethylsulphonyl-2-amino benzthiazole | N:N-di(β-ethoxycarbonylethyl)aniline | Red |
| 2-cyano-4-nitroaniline | N:N-di(β-ethoxycarbonylethyl)aniline | Bluish-red |
| 2-cyano-4-nitroaniline | N:N-[β-(β′-hydroxyethoxycarbonyl)ethyl]aniline | Bluish-red |
| 2-cyano-4-nitroaniline | 3-chloro-N:N-di(β-methoxycarbonylethyl)aniline | Red |
| 2:4-dicyanoaniline | N:N-di(γ-methoxycarbonylpropyl)-m-toluidine | Scarlet |
| 6-(β-hydroxyethylsulphonyl)-2-aminobenzthiazole | N:N-di(γ-methoxycarbonylpropyl)-m-toluidine | Bluish-red |
| 4-methylsulphonylaniline | 3-methylsulphonyl-N:N-di(β-methoxycarbonylethyl)aniline | Orange |
| 6-nitro-2-aminobenzthiazole | N:N-di(β-ethoxycarbonylethyl)aniline | Bluish-red |
| 4-nitro-2-aminobenzthiazole | N:N-di(β-ethoxycarbonylethyl)aniline | Red |
| 4-chloro-6-nitro-2-amino benzthiazole | N:N-di(β-propoxycarbonylethyl)aniline | Bluish-red |
| methyl-4-aminobenzoate | 3-methylsulphonylamino-N:N-di(β-methoxycarbonylethyl)aniline | Orange |
| 2-cyano-4-nitroaniline | 3-methylsulphonylamino-N:N-di(β-methoxycarbonylethyl) | Red |
| 2:6-dicyano-4-nitroaniline | 3-acetylamino-N:N-di(β-methoxycarbonylethyl)aniline | Blue |
| 2-cyano-4-nitroaniline | N:N-di(γ-methoxycarbonylpropyl)aniline | Red |
| 2-cyano-4-nitroaniline | N:N-di(γ-methoxycarbonylpropyl)-m-toluidine | Violet |
| 2-cyano-4-nitro-6-chloroaniline | N:N-di(γ-methoxycarbonylpropyl)m-toluidine | Violet |
| 3:4-dicyanoaniline | 2:5-dimethoxy-N:N-di(γ-ethoxycarbonylpropyl)aniline | Orange |
| 2:5-dicyano-4:6-dichloroaniline | N:N-di(δ-methoxycarbonylbutyl)m-toluidine | Red |
| 2:6-dichloro-4-nitroaniline | N:N-di(γ-methoxycarbonylpropyl)-m-toluidine | Brown |
| 2-cyano-4:6-dinitroaniline | N:N-di(γ-methoxycarbonylpropyl)-m-toluidine | Violet |
| 2-chloro-4-nitroaniline | N:N-di(γ-methoxycarbonylpropyl)-m-toluidine | Bluish-red |
| 2-bromo-4:6-dinitroaniline | 2-ethoxy-5-acetylamino-N-[α:β-di(methoxycarbonyl)ethyl]aniline | Blue |
| 2-methoxycarbonyl-4-nitro aniline | N:N-di(β-methoxycarbonylethyl)aniline | Orange |
| 2-methoxycarbonyl-4-nitro aniline | 3-bromo-N:N-di(β-methoxycarbonylethyl)aniline | Orange |
| 2-methoxycarbonyl-4-nitro aniline | N:N-di(β-methoxycarbonylethyl)-m-toluidine | Red |
| 2-methoxycarbonyl-4-nitro aniline | 3-acetylamino-N:N-di(β-ethoxycarbonylethyl)aniline | Bluish-red |
| 2-methoxycarbonyl-4-nitro aniline | 3-formylamino-N:N-di(β-methoxycarbonylethyl)aniline | Bluish-red |

TABLE I-continued

| Amine | Coupling Component | Shade |
|---|---|---|
| 2-methoxycarbonyl-4-nitro aniline | 3-methoxy-N:N-di[β-(β'-hydroxyethoxycarbonyl) ethyl]aniline | Red |
| 2-chloro-4-nitroaniline | 3-acetylamino-N:N-di(ethoxycarbonylmethyl)aniline | Red |
| 2-methylsulphonyl-4-nitro aniline | N:N-di(β-methoxycarbonylethyl)aniline | Bluish-red |
| 2:4-dicyano-3:5-dimethyl-6-chloroaniline | N:N-di(β-methoxycarbonylethyl)-m-toluidine | Red |
| 2:6-dichloro-4-nitroaniline | 3:5-diacetylamino-N:N-di(β-methoxycarbonyl ethyl)aniline | Rubine |
| 2-amino-4-phenylthiadazole | 3:5-diacetylamino-N:N-di(β-methoxycarbonyl ethyl)aniline | Red |
| 6-methoxy-2-aminobenzthiazole | 3:5-diacetylamino-N:N-di(β-methoxycarbonyl ethyl)aniline | Red |
| 4-nitroaniline | 3:5-diacetylamino-N:N-di(β-methoxycarbonyl ethyl)aniline | Red |
| 2-cyano-4-nitro-6-bromo aniline | 3:5-diacetylamino-N:N-di(β-methoxycarbonyl ethyl)aniline | Blue |
| 2-amino-5-methylthiadiazole | 3:5-diacetylamino-N:N-di(β-methoxycarbonyl ethyl)aniline | Blue |
| 5-nitro-2-aminothiazole | 3:5-diacetylamino-N:N-di(β-methoxycarbonyl ethyl)aniline | Blue |
| dimethyl-2-aminoterephthalate | 1-ethyl-3-cyano-4-methyl-6-hydroxypyrid-2-one | Yellow |
| 2-amino-3-methoxycarbonyl-5-nitrothiophene | N:N-di(β-methoxycarbonylethyl)m-toluidine | Blue |
| dimethyl-2-aminoterephthalate | 3-acetylamino-N-(β-cyanoethyl)-N-[β-(β'-methoxyethoxycarbonyl)ethyl]aniline | Golden-Yellow |
| 3:4-di(methoxycarbonyl)aniline | N:N-diethylaniline | Golden-yellow |
| 3:5-dinitro-2-aminothiophene | N:N-di(β-methoxycarbonylethyl)-m-toluidine | Greenish-blue |
| 2-amino-3-ethoxycarbonyl-5-nitrothiophene | 2:5-dimethoxy-N-(β-methoxycarbonylethyl)aniline | Blue |
| 3:5-dinitro-2-aminothiophene | 3-acetylamino-N:N-di[β-(β'-methoxyethoxy carbonyl)ethyl]aniline | Blue |
| methyl-4-aminobenzoate | N-ethyl-N-(β-methoxycarbonylethyl)aniline | Yellow |
| methyl-4-aminobenzoate | 3-acetylamine-N-(β-cyanoethyl)-N-(β-ethoxy carbonylethyl)aniline | Yellow |

TABLE II

| Dyestuff | Shade |
|---|---|
| 1:4-di(β-ethoxycarbonylethylamino)anthraquinone | Blue |
| 1-amino-4-[4'-(α:β-di(β'-hydroxyethoxycarbonyl)-ethyl)anilino]anthraquinone | Blue |
| 1:4-di(β-methoxycarbonylethylamino)anthraquinone | Blue |
| 1:4-di(o-methoxycarbonylanilino)anthraquinone | Blue |
| 1:8-dihydroxy-4:5-di(β-methoxycarbonylethylamino)-anthraquinone | Greenish-blue |
| 1:8-dihydroxy-4:5-di[β-(β'-hydroxyethoxycarbonyl)-ethylamino]anthraquinone | Greenish-blue |
| 1:5-dihydroxy-4:8-di(β-methoxycarbonylethylamino)-anthraquinone | Greenish-blue |
| 1:5-dihydroxy-4:8-di[β-(β'-methoxyethoxycarbonyl)-ethylamino]anthraquinone | Greenish-blue |

We claim:

1. Process for the coloration of aromatic polyester or cellulose triacetate textile materials which comprises applying to the said textile materials by an aqueous dyeing, padding or printing process an aqueous dispersion of a disperse anthraquinone or azo dyestuff free from carboxylic acid or sulphonic acid groups, said dyestuff containing from 2 to 4 carboxylic acid ester groups, and subsequently giving the colored textile material a treatment in an aqueous solution of an alkali metal hydroxide or alkali metal carbonate having a pH above 8 and at a temperature between 50° and 85° C.

2. Process as claimed in claim 1 wherein the aqueous solution of the alkali metal hydroxide or carbonate additionally contains from 0.2 to 1.0% by weight based on the weight of the solution of a synthetic detergent.

3. Process as claimed in claim 1 wherein the disperse azo dyestuff is a disperse monoazo dyestuff containing from 2 to 4 ester groups of the formula —COO lower alkyl.

* * * * *

Disclaimer 4,030,881.—*Violet Boyd, Brian R. Fishwick* and *Brian Glover,* Manachester, England. COLORATION PROCESS. Patent dated June 21, 1977. Disclaimer filed Dec. 28, 1979, by the assignee, *Imperial Chemical Industries Ltd.*

Hereby enters this disclaimer to all claims of said patent.

[*Official Gazette September 7, 1982.*]